A. W. BEAMAN.
CRANK HANDLE.
APPLICATION FILED DEC. 10, 1908.
944,534.
Patented Dec. 28, 1909.
2 SHEETS—SHEET 1.
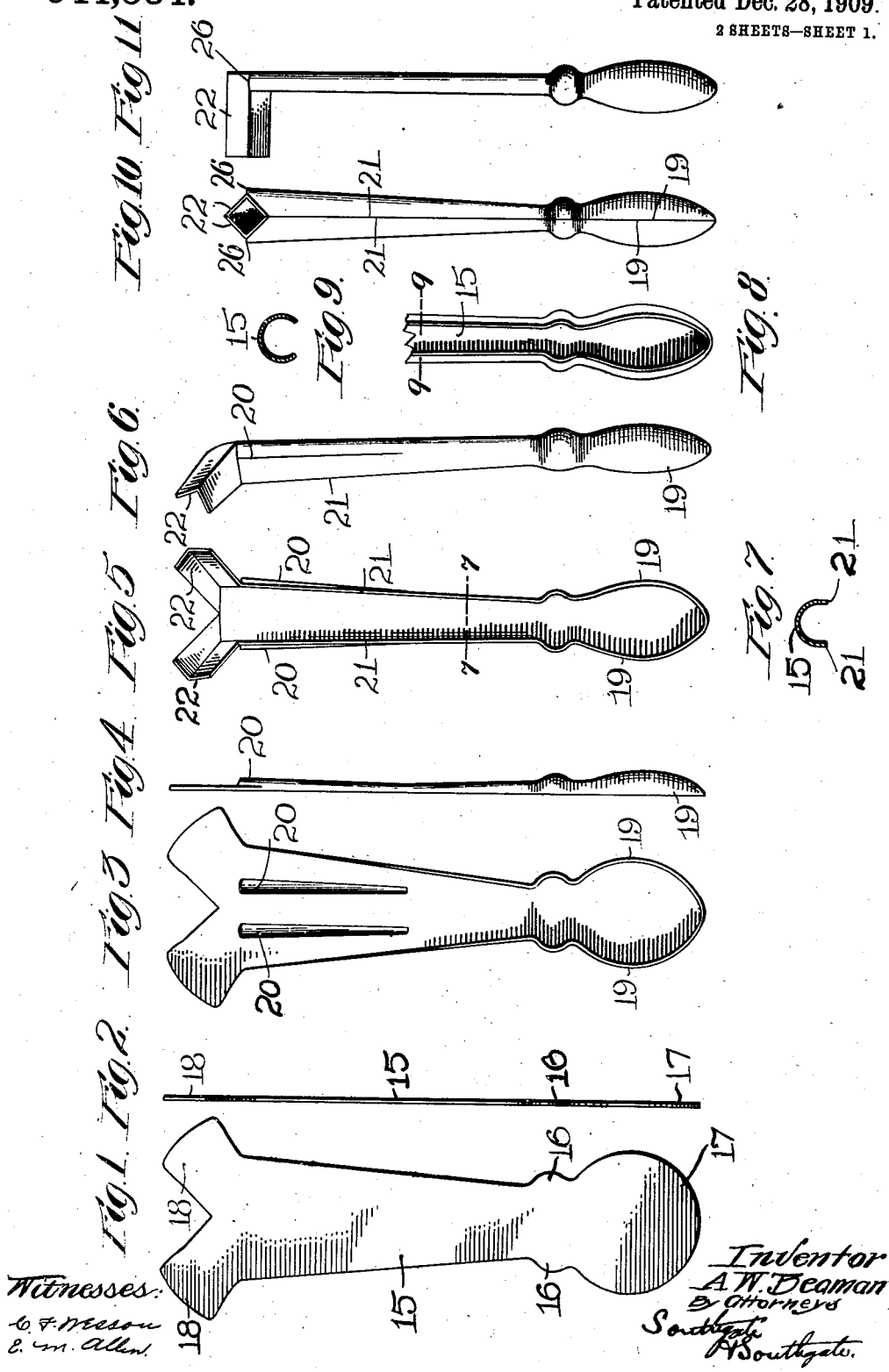
Witnesses:
Inventor
A. W. Beaman
By Attorneys
Southgate & Southgate.

A. W. BEAMAN.
CRANK HANDLE.
APPLICATION FILED DEC. 10, 1908.
944,534.
Patented Dec. 28, 1909.
2 SHEETS—SHEET 2.
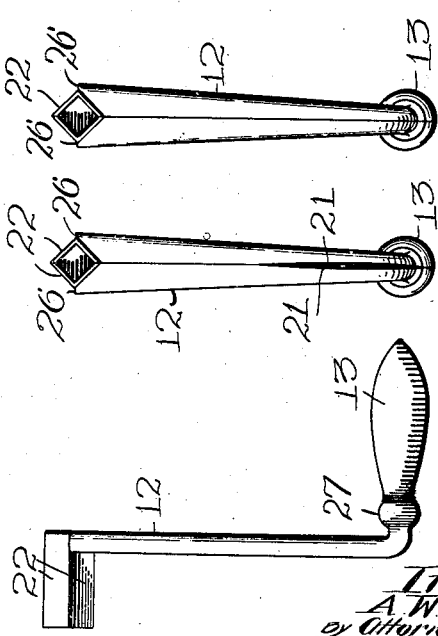
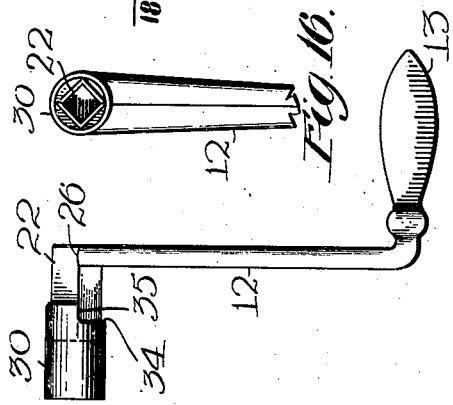
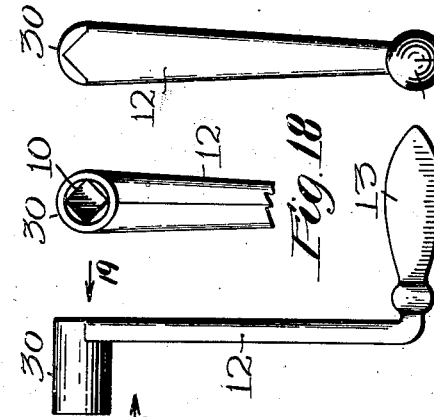
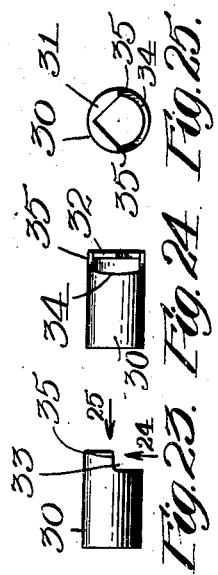

UNITED STATES PATENT OFFICE.

ARTHUR W. BEAMAN, OF WORCESTER, MASSACHUSETTS.

CRANK-HANDLE.

944,534.     Specification of Letters Patent.     Patented Dec. 28, 1909.

Application filed December 10, 1908. Serial No. 466,736.

*To all whom it may concern:*

Be it known that I, ARTHUR W. BEAMAN, a citizen of the United States, residing at Worcester, in the county of Worcester and State of Massachusetts, have invented a new and useful Crank-Handle, of which the following is a specification.

This invention relates to a crank handle.

The principal objects of the invention are to provide a construction which will be capable of use for various purposes including crank handles and which will permit of manufacturing the same in large quantities in an inexpensive manner and at the same time provide the necessary strength with a minimum amount of metal so that the articles will be of very light weight; also to provide certain features of construction whereby sheet metal can be used for articles of this kind.

Further objects and advantages of the invention will appear hereinafter.

Reference is to be had to the accompanying drawings illustrating a practicable form of the invention in which, Figure 1 is a plan of a blank for a crank handle. Fig. 2 is a side elevation thereof. Fig. 3 is a plan of the blank after the first operation is performed thereon. Fig. 4 is a side view thereof. Fig. 5 is a plan of the same blank after another operation is performed. Fig. 6 is a side view thereof. Fig. 7 is a sectional view of the same on the line 7—7 of Fig. 5. Fig. 8 is a fragmentary plan showing the blank after another operation is performed. Fig. 9 is a transverse sectional view on the line 9—9 of Fig. 8. Fig. 10 is a plan showing the device after the next operation is performed. Fig. 11 is a side view thereof. Fig. 12 is a side view of the blank in substantially the same condition after the handle is turned down at right-angles. Fig. 13 is a plan of the same. Fig. 14 is a view similar to Fig. 13 showing another operation. Fig. 15 is a side view showing the application of a strengthening ferrule to the socket end of the crank handle. Fig. 16 is a plan of a portion of the same. Fig. 17 is a side view of the complete crank handle in its preferred form. Fig. 18 is a plan of a portion of the same. Fig. 19 is a bottom plan thereof. Fig. 20 is a plan of the ferrule in the first stage of manufacture. Fig. 21 is a side view thereof. Fig. 22 is a plan showing the next step in the manufacture of the ferrule. Fig. 23 is a side view showing the ferrule ready for application to the crank handle. Fig. 24 is a view of another side of the ferrule in the same condition as it appears in Fig. 23, and Fig. 25 is a bottom plan view of the ferrule.

An article constructed in accordance with this invention as has been stated is shown complete in Figs. 17, 18 and 19. Referring to these figures, the crank handle is shown as having a polygonal socket 10 surrounded by a strengthening ferrule 30 of sheet metal and is provided with a main portion or shank 12 of sheet metal in a hollow form which terminates in an integral handle 13 also of hollow sheet metal. In order to produce a crank handle of this character, the following steps preferably are taken. The procedure illustrated in the drawings is as follows: First a blank 15 of sheet metal is cut out having a main shank portion tapering from one end to the other, and provided at one end with shoulders 16 and a substantially circular end 17. At the other end it is provided with a pair of diverging arms 18. This is illustrated in Figs. 1 and 2. The first operation to be performed is preferably to operate on this blank by dies so as to curl up the edges 19 of the circular end as is shown in Figs. 3 and 4. Preferably at the same time a pair of substantially parallel projecting ribs 20 are formed near the opposite end of the blank which terminate at the inner ends of the arms 18. These ribs are at a distance apart equal to the width of the shank of the completed article. When this has been done the blank is again placed in dies and substantially the whole of the shank portion is turned up at the edges 21 so as to give a trough-shaped form and bring the edges 19 and the edges of the main part of the shank up into substantially a parallel position as shown in Fig. 7. Preferably at the same time the two arms 18 are pressed out as shown at 22 to form trough-shaped diverging members each having a form corresponding to half of a regular polygon. After this has been done the main portion and handle portion at the end are pressed at the side as shown in Fig. 8 so as to form a cross section similar to that shown in Fig. 9. Then preferably by means of dies another pressing operation is performed so as to close together the edges 19 and 21 and produce a form like that shown in Figs. 10 and 11. It will be noticed that here the edges of the trough-shaped arms 22 are brought together at the same time and that the ribs 20 terminate in shoulders 26 projecting beyond the corners of the arms 22 a distance equal to the thickness of the metal. This produces a straight hollow article having a projecting socket member preferably of polygonal form which itself could be used as a wrench or crank handle for some purposes.

In order to produce the particular form of the invention shown in Figs. 17, 18 and 19 the manufacture of the device is preferably continued as follows:—The end formed of the parts 17 and 19 is bent down at right angles to form a handle 13. This preferably is bent away from the joint between the edges 21 formed when the parts are brought into the condition shown in Fig. 10, and it is found in practice that this separates said joint as is indicated in Fig. 13. The next step therefore is to close it again, which preferably is done by dies and which brings the parts into the form shown in Fig. 14. The crank handle is now completed, except for the socket end which as so far stated is formed from the arms 18 bent into the trough-shape arms 22 and then brought together. In order to strengthen and complete this part a ferrule 30 is constructed. This is first pressed out of sheet metal into cup-shape form as shown in Figs. 20 and 21. This ferrule has a bottom 31 which is punched out at 32 to form a polygonal or other shaped opening similar to the shape of the passage between the arms 22 according to the use to which the article is to be put, and it is also died out at 33 to form a shoulder 34 having a slightly curved edge and having walls 35 at the ends. The ferrule in this position is forced on the trough shaped arms 22 as indicated in Fig. 15. It will be understood of course that it could be applied directly to the form shown in Figs. 10 and 11 in the same way. When the ferrule is forced to its extreme position it will be seen that the walls or lips 35 at the ends fit against the pair of shoulders 26 formed at the ends of projecting ribs 20. The purpose of these ribs will now be seen. They were originally formed in such position that when the shank part of the article was completed they would be located at the sides of the trough-shaped arms and overlap the same so as to project therefrom as shown most clearly in Figs. 5, 10 and 14. Their outer edges are now flush with the outer surface of the ferrule and their ends engage against the shoulders 35 so as to assist in holding the ferrule properly in position and to strengthen the device at this point. It will be understood, of course, that the opening 32 in the end wall of the ferrule registers with the ends of the arms 22 and if the device is intended to fit a square nut or bolt this opening is made square, and the arms 22 are formed to produce a square end. If the implement is to be used for any other form of bolt or nut these two parts will be modified accordingly in a very obvious manner. When the parts are fixed in position as indicated in Fig. 17, the end wall 31 of the ferrule is upset or swaged inwardly so as to overlap the ends of the arms 22 and securely fix the ferrule thereon. The swaging of the wall 31 not only clamps said wall against the ends of the arms 22, but it has a tendency to force the angular outer edges of said arms into close and firm contact with the interior of the ferrule so as to secure the same firmly in position. The shoulders 16 form a rounded bead 27 on the completed article. It will be seen that in this way a very practical way of manufacturing a crank-handle, or the like, is secured and one which does away with the expensive operation of molding and casting, and which has many advantages over the forging methods which have been employed on some types of articles of this character. In addition to this a device is secured which is very much lighter than any implement of equal strength and size which can be made of solid metal, as it is well understood that a hollow structure is much stronger than a solid one having the same amount of metal.

It is to be understood many modifications can be made in the details of construction of the article without departing from the scope of the invention as expressed in the claims. Therefore I do not wish to be limited to all the details of construction shown and described, but What I do claim is:—

1. As an article of manufacture, a crank arm having a main body part of hollow sheet metal, a hollow handle at the end thereof constituting a continuation of the sheet metal of the body part, and a socket member integral with the main body part.

2. As an article of manufacture, a crank handle having a handle, a main portion, and a socket, said socket comprising a pair of sheet metal arms, and said body portion being formed of a single piece of sheet metal integral with said arms.

3. As an article of manufacture, a crank arm having a hollow handle, a hollow main or body part integrally connected with the handle and provided with a seam on the side opposite the handle, and a socket portion comprising arms integral with said main body portion.

4. As an article of manufacture, a crank handle having a socket, a main body portion, and a handle, said main body portion consisting of a piece of sheet metal bent up at the edges until said edges meet to form a longitudinal seam on one side thereof, and said handle constituting a continuation of said body portion having a seam on the outer side in continuation of the seam on said body portion.

5. As an article of manufacture, a crank handle comprising a hollow sheet metal body portion, a hollow handle and a socket, said socket comprising sheet metal arms integral with the body portion and having a passage between them constituting a socket, and a ferrule secured to said arms and body portion and surrounding the arms.

6. As an article of manufacture, a crank arm comprising a hollow sheet metal body portion and handle integral with each other, and a socket comprising two arms integral with the body portion and extending at right angles to the plane thereof, said arms having a passage between them, and a sheet metal ferrule around said arms and having an end wall cut out to form an opening of the same shape as the passage between said arms.

7. As an article of manufacture, a crank arm comprising a hollow sheet metal portion and handle integral with each other, and a socket comprising two arms integral with the body portion and extending at right-angles to the plane thereof, said arms having a passage between them, and a sheet metal ferrule around said arms and having an end wall cut out to form an opening of the same shape as the passage between said arms, the remaining portion of the end wall of the ferrule being swaged inwardly against the ends of said arms so as to secure the ferrule thereon.

8. As an article of manufacture, a crank arm comprising a hollow sheet metal main portion, a handle, two arms projecting at right angles from the end of the main portion and integral therewith and having between them a polygonal passage, and a sheet metal ferrule surrounding said arms and secured to them, said ferrule extending from the outer ends of the arms inwardly into engagement with the main portion on one side and flush with the opposite edge of the main portion on the other side and having means for securing it to the ends of the arms.

9. In an article of the class described, the combination of a hollow sheet metal main portion having two integral arms projecting at right angles therefrom and in contact with each other at their edges and having a polygonal passage between them, and a sheet metal ferrule fitting on said arms and extending the whole length thereof, said ferrule being cut out on one side to receive the end of the main portion and being provided with a wall at the other end having a passage therethrough of the same shape as, and registering with, the passage between the arms, said wall being swaged into firm contact with the ends of said arms.

10. In an article of the class described, the combination of a sheet metal main portion having integral arms projecting at right angles therefrom and in contact with each other at their edges and having a passage between them, and a sheet metal ferrule fitting on said arms and provided with a wall at one end having a passage therethrough of the same shape as, and registering with, the passage between the arms, said wall being swaged into firm contact with the ends of said arms, said main portion having at its edges outwardly projecting ridges flush with the surface of the ferrule and engaging it.

11. In an article of the class described, the combination of a hollow sheet metal body portion having integral opposite sheet metal arms extending at right angles from one end and having a polygonal passage between them, and having two opposite outwardly extending ridges at the outer edges of said arms extending beyond them, and a sheet metal ferrule fitting over said arms and cut out on one side to receive said body portion, the ends of said ridges abutting against the ends of said cut out portion and being flush therewith, and means whereby said ferrule is firmly held in position on the arms.

12. As an article of manufacture, a crank handle comprising a hollow sheet metal body portion, and a socket having a part integral therewith, said body portion being provided with outwardly projecting ridges at one end extending to the other sides of the socket and constituting the opposite edges of the body portion.

13. As an article of manufacture, a crank handle comprising a hollow sheet metal body portion, a handle integral therewith, and a socket comprising two parts, an inner part integral with the body portion, and an outer part secured thereto, said body portion having two opposite outwardly extending ridges forming the sides thereof projecting beyond the integral portion of the socket and flush with the outer portion thereof.

14. As an article of manufacture, a crank handle comprising a hollow sheet metal body portion, a handle integral therewith, and a socket at the end of the body portion comprising two parts, an inner part integral with the body portion, and an outer part secured thereto.

In testimony whereof I have hereunto set my hand, in the presence of two subscribing witnesses.

ARTHUR W. BEAMAN.

Witnesses:
ALBERT E. FAY,
C. FORREST WESSON.